US009945215B2

(12) United States Patent
Godfrey

(10) Patent No.: US 9,945,215 B2
(45) Date of Patent: Apr. 17, 2018

(54) DETERMINING PERFORATION ORIENTATION

(75) Inventor: Alastair Godfrey, Farnborough (GB)

(73) Assignee: Optasense Holdings Limited (GB)

(*) Notice: Subject to any disclaimer, the term of this patent is extended or adjusted under 35 U.S.C. 154(b) by 494 days.

(21) Appl. No.: 14/239,747

(22) PCT Filed: Aug. 24, 2012

(86) PCT No.: PCT/GB2012/052094
§ 371 (c)(1),
(2), (4) Date: Feb. 19, 2014

(87) PCT Pub. No.: WO2013/030555
PCT Pub. Date: Mar. 7, 2013

(65) Prior Publication Data
US 2014/0208843 A1    Jul. 31, 2014

(30) Foreign Application Priority Data
Aug. 26, 2011 (GB) .................................. 1114834.3

(51) Int. Cl.
E21B 43/119 (2006.01)
E21B 47/12 (2012.01)
(Continued)

(52) U.S. Cl.
CPC .......... *E21B 43/119* (2013.01); *E21B 47/024* (2013.01); *E21B 47/02208* (2013.01); *E21B 47/123* (2013.01); *G01V 11/005* (2013.01)

(58) Field of Classification Search
CPC . E21B 43/119; E21B 47/02208; E21B 47/024
(Continued)

(56) References Cited

U.S. PATENT DOCUMENTS 6,508,307 B1 * 1/2003 Almaguer ................ C09K 8/68
166/297
2009/0114386 A1 5/2009 Hartog et al.
(Continued)

FOREIGN PATENT DOCUMENTS

CN 101761330 6/2010
EP 2386881 11/2011
(Continued)

OTHER PUBLICATIONS

Molenaar et al., "First Downhole Application of Distributed Acoustic Sensing (DAS) for Hydraulic Fracturing Monitoring and Diagnostics", SPE Hydraulic Fracturing Technology Conference and Exhibition, SPE, US, Jan. 24, 2011, pp. 1-9.

*Primary Examiner* — Peter Macchiarolo
*Assistant Examiner* — Anthony W Megna Fuentes
(74) *Attorney, Agent, or Firm* — McDonnell Boehnen Hulbert & Berghoff LLP

(57) ABSTRACT

A method and apparatus for determining the relative orientation of objects downwell, and especially to determining perforator orientation, involves varying the orientation of an object, such as a perforator gun (302) in the wellbore (202) and activating at least one directional acoustic source (402a-c). Each directional acoustic source is fixed in a predetermined location to the object and transmits an acoustic signal preferentially in a known direction. The directional acoustic sources are activated so as to generate sound in a plurality of different orientations of said object. An optical fiber (104) is interrogated to provide distributed acoustic sensing in the vicinity of the object; and the acoustic signals detected by the optical fiber are analyzed to determine the orientation of the at least one directional acoustic source relative to the optical fiber, for instance by looking at the relative intensity in the different orientations.

16 Claims, 3 Drawing Sheets

(51) Int. Cl.
*E21B 47/022* (2012.01)
*E21B 47/024* (2006.01)
*G01V 11/00* (2006.01)

(58) Field of Classification Search
USPC .......................................... 73/152.24, 152.28
See application file for complete search history.

(56) References Cited

U.S. PATENT DOCUMENTS

| | | |
|---|---|---|
| 2009/0166035 A1 | 7/2009 | Almaguer |
| 2010/0107754 A1* | 5/2010 | Hartog .................. E21B 47/101 |
| | | 73/152.47 |
| 2010/0200743 A1 | 8/2010 | Forster et al. |
| 2011/0088462 A1 | 4/2011 | Samson et al. |
| 2012/0013893 A1* | 1/2012 | Maida ..................... E21B 47/16 |
| | | 356/73.1 |

FOREIGN PATENT DOCUMENTS

| | | |
|---|---|---|
| EP | 2 418 466 | 2/2012 |
| GB | 2442745 | 4/2008 |
| WO | WO 2010/136773 | 12/2010 |
| WO | WO 2012/028846 | 3/2012 |

\* cited by examiner

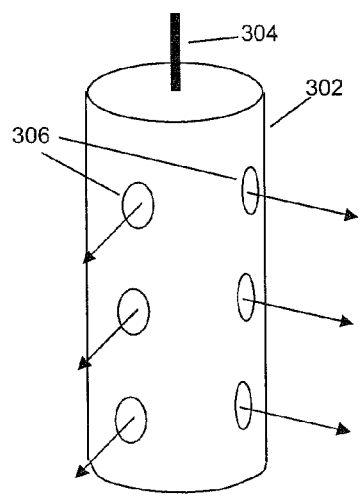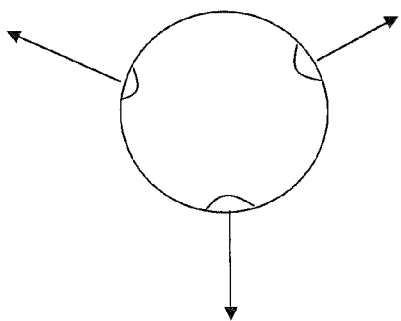
Fig. 3a          Fig. 3b
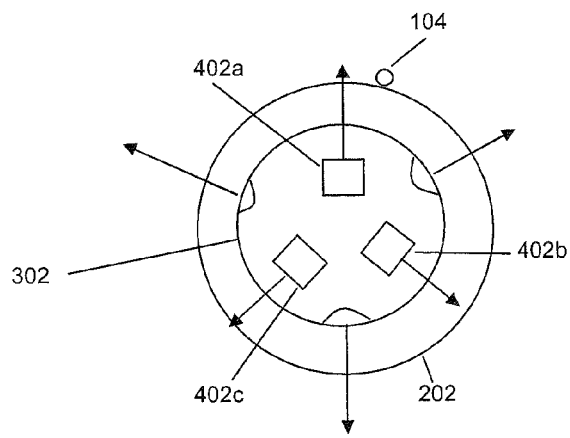
Fig. 4

DETERMINING PERFORATION ORIENTATION

FIELD OF THE INVENTION

The present invention relates to the determining the orientation of an object such as a perforator in a downwell environment and hence the direction of perforation and in particular to methods and apparatus for determining perforator orientation downwell using fibre optic distributed acoustic sensors.

BACKGROUND OF THE INVENTION

In typical well formation for many oil and gas wells, a well bore is drilled and then a metal casing is forced down the borehole with sections of casing being joined to one another. Once the casing is in place the outside of the casing is filled with cement, at least to a certain well depth, to effectively the seal the casing from the surrounding rock and ensure that, in use, the only flow path is through the casing. Once the cement has cured the well is typically perforated by lowering a 'gun' which comprises one or more shaped charges to a desired depth of the well bore.

When the perforation charges are fired the shaped charges perforate the casing, cement and rock bed in the direction that the charge is facing and thus create a flow path from the reservoir into the well. In some well formations the perforations may be stimulated, for instance by hydraulic fracturing or acidization to increase flow, and then production equipment, filters, sand screens, production tubing and the like may be fitted. A similar process may be used in some injection wells, for instance for sequestration of unwanted and/or hazardous materials.

In some well formations optical fibres are deployed down the wellbore to be used for sensing purposes. For example patent application WO2010/136773 discusses use of an optical fibre deployed downwell to provide distributed acoustic sensing (DAS) downwell Fibre optic distributed acoustic sensing (DAS) is a known technique whereby a single length of optical fibre is interrogated, usually by one or more input pulses of light, to provide substantially continuous sensing of acoustic activity along its length. Optical pulses are launched into the fibre and the radiation backscattered from within the fibre is detected and analysed. By analysing the radiation backscattered within the fibre, the effect of acoustic signals incident on the fibre can be detected. The backscatter returns are typically analysed in a number of time bins, typically linked to the duration of the interrogation pulses, and hence the returns from a plurality of discrete sensing portions can be separately analysed. Thus the fibre can effectively be divided into a plurality of discrete sensing portions of fibre. Within each discrete sensing portion disturbance of the fibre, for instance from acoustic sources, cause a variation in the properties of radiation which is backscattered from that portion. This variation can be detected and analysed and used to give a measure of the intensity of disturbance of the fibre at that sensing portion.

As described in WO2010/136773 the fibre optic cable may be attached to the outside of the casing as it is forced into the wellbore and then cemented in pace during the cementing step. It is also known to provide distributed temperature sensing using a downwell optical fibre and again this fibre may be located on the outside of the production casing.

One problem that arises with this approach is that the optical fibre is in situ during the perforation step. Were a perforation charge to be fired in the direction of the optical fibre, the perforation step could sever, or at least severely damage, the fibre at that location with the result that no useable optical signal can be received from the optical fibre at locations deeper into the well. As the well may be perforated at several sections along it length, damage to the optical fibre at a section towards the top of the well could mean that no useable signals may be received from the section of fibre deployed in the production zone. It will of course be understood that as the optical fibre is clamped in pace to the casing and cemented in place replacing a damaged optical cable is not a viable option.

The perforation gun, which typically contains several shaped charges and may have shaped charges directed in various different directions, may therefore oriented before firing to avoid the optical fibre. However at a perforation depth which may be a kilometer or more and could be several kilometers the relative location of the fibre may not be known, and it can also be problematic to accurately orient the perforation charges.

It is known therefore to clamp the optical fibre in relation to a metallic feature on the casing, for instance the fibre may clamped next to a metallic object, such as a metal rod which is also clamped to the outside of the casing. The perforator gun containing the shaped charges may then be provided with a magnetic anomaly detector which is connects to the surface. The readout from the magnetic anomaly detector may therefore be used to determine the orientation of the perforator gun with respect to the metallic feature and hence the optical fibre.

It has been found however that such magnetic anomaly detection techniques are not always satisfactory and the magnetic signature may be masked in the downhole environment with the result that the perforator can be incorrectly aligned when fired and the optical fibre has been damaged.

Alignment of a perforator gun with respect to the optical fibre is particularly important as incorrect alignment may result in damage to the optical fibre. However there may well be other tools that are deployed downwell, for instance via wire line, where knowing the orientation of the tool may be useful and where magnetic anomaly detection may be insufficiently accurate.

It is therefore an object of the present invention to provide methods and apparatus for orienting objects, especially perforators, downwell which at least mitigate some of the aforementioned disadvantages.

SUMMARY OF THE INVENTION

Thus according to the present invention there is provided a method of orienting an object in a wellbore comprising varying the orientation of the object in the wellbore, activating at least one directional acoustic source arranged in fixed relation to said object so as to generate sound in a plurality of different orientations of said object, interrogating an optical fibre deployed down the wellbore to provide distributed acoustic sensing in the vicinity of the object and analysing acoustic signals detected by the optical fibre so as to determine the orientation of the at least one directional acoustic source relative to the optical fibre.

The method of the present invention therefore provides the object, such as the perforation gun, with at least one directional acoustic source in fixed relation to the object and then uses the optical fibre deployed down the well bore to provide distributed acoustic sensing (DAS) so as to determine the orientation of the object. The acoustic signals detected by the DAS sensor from a plurality of different orientations of the object are analysed to determine the orientation of the directional acoustic source, and hence the object, to the optical fibre.

Conveniently the acoustic signals are analysed to determine the relative intensity of the detected acoustic signals. Consider a single directional acoustic source located on an object as that object is rotated through 360°. The detected acoustic signal will generally be most intense when the acoustic source is pointing directly toward the location of the optical fibre and the detected signal may be at a minimum when the directional acoustic source is pointing away from the location of the optical fibre. Thus the method may comprise analysing the detected signals to determine the orientation of the object which leads to the greatest detected acoustic intensity.

The method may therefore comprise positioning the object at the required position in the well, e.g. the required depth in a generally vertical well section, and monitoring the acoustic signals detected by the DAS sensor as the object is rotated through various orientations.

The directional acoustic source may be any acoustic source that generates acoustic waves that have a noticeably greater intensity in one direction than in other directions. Whilst a standard loudspeaker has some directionality in the sound intensity is generally greater in front of the loudspeaker than behind, and is greatest in the direction normal to the centre of the loudspeaker, the directionality is somewhat limited. The directionality can be improved by locating the acoustic transducer in a suitable housing, for instance one which tends to reflect sound in the desired direction and/or attenuate or absorb sound travelling in other directions. Thus a directional acoustic source could comprise a loudspeaker in a suitable housing to provide directionality.

It is also known to provide directionality by using an array of transducers, for instance MEMS acoustic transducers and beamforming type techniques to provide directionality. A directional acoustic source may therefore comprise an array of acoustic transducers configured to provide increased directionality, again possibly within a suitable housing. Further it is known to provide directionality in acoustic sources by using a relatively high frequency wave to give directionality and using this directional wave to effectively carry the desired acoustic signal. The skilled person will also appreciate that the directionality of a loudspeaker type acoustic source typically depends on the size of the loudspeaker relative to the wavelength transmitted and that relatively smaller wavelengths will generally be more directional. Thus the directional acoustic source could comprise a source which uses a relatively high frequency wave to provide directionality. Even when using a standard loudspeaker arrangement the loudspeaker may be configured to transmit at relatively high frequencies that can be detected by the DAS sensor to improve directionality.

The acoustic source need not be a loudspeaker type source however and anything which produces an acoustic signal that could be detected by the DAS sensor and which has directionality to the acoustic emissions could be used.

The directional acoustic source is arranged in fixed relation to the object, i.e. the direction of transmission from the directional acoustic source is fixed in relation to an orientation of the object. The direction of transmission is conventionally radial to the object when in the well bore. Conveniently the at least one directional acoustic source is fixed to or forms part of the object but in some embodiments the source could, for example, be fixed to the wire line supporting the object so as to move with the object. The source is configured to transmit preferentially in a direction relative to an orientation of the object. Thus, for example, if the object is a perforation gun having one or more perforation directions the source will be located so as to transmit in a direction having a known relation to the perforation directions. As a simple example if the perforation gun had a string of charges arranged to fire in three evenly spaced directions, i.e. at directions 120° apart, an acoustic source could be located to transmit along a direction which is the opposite direction to one of the three perforation directions, i.e. a direction which is 60° between each of the other two perforation directions. Downwell, detecting the orientation that leads to the greatest intensity signal would correspond to the perforator being oriented with the perforation directions all being pointed away from the optical fibre. Thus the perforator could be re-oriented until the maximum signal intensity is detected and then kept in this location for firing. Of course it would be possible to arrange the transmission direction at different known orientations to a perforation detection, for instance along a perforation direction, and the method may comprise locating the position of maximum intensity and then applying a predetermine change in orientation before firing.

The directional acoustic source may transmit at a predefined frequency. Transmitting at a predefined frequency may aid in identifying the signal from the directional acoustic source in the signals detected by the DAS sensor. The method may therefore comprise analysing the detected signals for a predetermined frequency, for example by applying a filter. Additionally or alternatively the frequency emitted by the source may be varied over time. The frequency could be varied during a period of continuous transmission, i.e. the acoustic source may emit a chirped signal or alternatively the source may transmit a first frequency for a first period and then at least a second frequency for at least a second period. Changing the frequency of transmission may reduce errors as at some frequencies it may be difficult to clearly determine a significant change in intensity, for instance due to resonance/reflection effects or background signals at that frequency and the like. By using a plurality of frequencies the likelihood of detecting a useable change in intensity is increased. The method may therefore comprise correlating the acoustic signals detected at various orientations at various different frequencies.

The acoustic transducer may also be arranged to vary the type of sound produced. For instance some or all of continuous sound, rising pitch, falling pitch and/or intermittent sound may be generated. Again some types of sound may be more readily detected than others.

In some embodiment the acoustic source may be configured to transmit relatively constantly as the object is re-oriented. In some embodiments however the object may be oriented to a first position and one or more acoustic sources activated and then stopped prior to changing the orientation of the object. In other words a series of different measurements are taken in different fixed orientations.

In some embodiments it may also be beneficial to activate a source for a period of time and then deactivate it for a period of time and then reactive it, with the period between subsequent activations of the sources being sufficient to allow for significant echoes and/or reflections of the acoustic waves to die away.

In some embodiments the object may be provided with more than one directional acoustic source with at least some acoustic sources being arranged to transmit in different directions. Having more than one directional acoustic source may provide redundancy in case of failure of one of the acoustic sources. Having directional acoustic sources pointing in different directions however can potential either reduce the amount of re-orientation of the object required downwell and/or improve the accuracy of the resulting determination of orientation of the object.

For example an object could be provided with directional acoustic sources arranged around the object. Thus two acoustic sources could be arranged to point in directions 180° or so apart, three acoustic sources to point in directions 120° or so apart and so on, although other arrangements are clearly possible.

Each acoustic source could then be activated in turn or in any given sequence and the acoustic signals corresponding to each source analysed together. In this embodiment it may not be necessary to rotate the object through a full 360°. For some objects it may not be possible or trivial to rotate the object by 360° in situ and thus reducing the amount of re-orientation required may be beneficial. For example, if four directional acoustic sources were arranged with each source pointing in directions 90° apart from its neighbouring sources, then rotating the object by just 90° would sweep each source through a different 90° sector of the well bore. If the sources are calibrated to produce the same intensity signal as one another the effect will therefore be the same as if a single source had been swept around the whole of the wellbore. Even if the sources were not exactly calibrated by looking at the change in intensity it should be possible to determine the orientation of each source relative to the optical fibre. In a simplistic analysis the signals received from a first source that is actually swept past the fibre location will show an intensity that increases to a maximum when the source is pointing at the fibre and then drops again as the source is swept past. For signals received from second and third sources either side of the first source, one set of signals will show increasing intensity as the angle between the direction of transmission and the direction to the optical fibre decreases and the signals corresponding to the other source will shows the opposite. For the signals from the fourth source, opposite the first source, the intensity will drop to a minimum when the source is pointing away from the fibre and then increase. Thus it can be seen the signals from the source which is swept past the optical fibre location can be identified and thus the location of the optical fibre relative to the orientation of the object determined.

In some embodiments at least some of the plurality of directional acoustic sources may transmit at different frequencies. As mentioned above different frequencies can be useful in improving the change of receiving detectable signals. In addition if different acoustic sources transmit at different frequencies the sources can be operated at the same time and the acoustic signals due to each source can be discriminated from the detected acoustic signals by frequency analysis. The different acoustic sources may be arranged to transmit different types of sound as discussed above.

A directional acoustic source used in embodiments of the present invention may be electrically powered. In which case the source could be powered via a power line running from the surface, or battery powered, either via a battery specifically powered for the acoustic sources or via a battery present in the object. The acoustic source could be a self contained unit with its own power source which is attached to, or formed as part of, the object. The power required to run an acoustic source for the period needed for orienting the object is not great and using self contained acoustic sources allows sources to be retrofitted to existing downwell tools.

The acoustic source could be pre-programmed to activate at certain times or may simply operate continuously in a known pattern. Where there are a plurality of acoustic sources, they may be controlled by a single controller located on the object or each acoustic source may be independently controlled and suitably pre-programmed. By pre-programming the acoustic sources no command or control communication with the source(s) is required, which may again allow retrofitting. Alternatively the acoustic source(s) could be controlled by the surface for instance via a suitable data link, which may for instance be a fibre optic data link. This allows the source(s) to be controlled exactly as and when required.

Especially when using one or more directional acoustic sources with a perforation gun it may be important to ensure that no stray electrical signals could interfere with the operation of the perforation gun. Using self contained acoustic sources with either no control link or a fibre optic control link may minimise any risk in operating the acoustic source(s).

It will be appreciated that downwell tools may operate in variety of different environments. For instance the wellbore may be filled with water prior to perforation whereas another downwell tool may be inserted when the well is filled with oil or gas. The acoustic sources should be relatively rugged and able to operate in the intended environment. Thus the acoustic sources may be able to be immersed in liquid such as water and produce directional acoustic signals in that liquid.

The optical fibre may, as described previously, be an optical fibre that is attached to the outside of a well casing. The optical fibre may be cemented in place.

The methods of the present invention may be used instead of the magnetic anomaly techniques mentioned above but in some embodiments may be used in addition to such magnetically anomaly techniques. The results from the magnetic anomaly detector may be compared and/or correlated with the result from the DAS sensor to determine the orientation of the object.

In order to improve the performance of the magnetic anomaly detector it is possible to design the optical fibre to provide an increased magnetic disturbance. Thus the optical fibre may be provided with magnetically active elements running along the length of the fibre.

In one embodiment the fibre optic cable comprises magnetic materials disposed along its length. The fibre optic cable could be formed by filing the cable with a mixture comprising magnetic particles and/or at least some layers could be coated with a coating of magnetic particles. The coated layers could be the layers surrounding an optical fibre within the cable and/or those layers forming the cable jacket layers. Some fibre optic cable designs use metallic braiding to provide strength and/or protection for the fibre optic cable. Suitable magnetic materials could be used for the braiding. By including such magnetic material within the fibre optic cable the magnetic signature of the cable may be increased.

Additionally or alternatively the fibre optic cable could be provided with a conductive material running up and down along its length. In other words the fibre optic cable could include a conductive path running down the cable and then back again. For example the fibre optic cable may comprise first and second conductors running the length of the cable which are conductively coupled together at the distal end of the cable. This provides a route for current to flow within the fibre optic cable. Applying a potential difference to the two ends of the conductive path at the proximal end of the fibre can allow a current to flow which will generate an electromagnetic field. This can increase the magnetic signature of the cable.

It will be appreciated that with long runs of fibre optic cable the overall conductive path could be very long and thus high voltages may be required. Using high voltages to generate current may not be acceptable in many downwell environments and so the use of conductors to generate an increased magnetic signature may only be used in certain applications.

As mentioned above the method is particularly applicable to orienting a perforator downwell and thus the object may be a perforator. The invention also therefore provide a method of perforating comprising using the method described above to determine the orientation of the perforator relative to the optical fibre, orienting the perforator to avoid the optical fibre and firing the perforator.

The present invention also relates to a method of processing signals acquired from a distributed acoustic sensor comprising: taking a plurality of measurement signals acquired when an object having at least one directional acoustic source is located downwell and wherein said signals correspond to a plurality of orientations of said object and processing the measurement signals to determine the orientation of said object relative to the optical fibre.

The method may involve determining the maximum intensity signal detected from a directional acoustic source and determining the orientation of the object that corresponds to said maximum intensity signal.

The present invention in general relates to the use of DAS sensing to determine the orientation of objects, having directional acoustic sources, in a wellbore.

As mentioned the method is particularly useful for determining the orientation of a perforation gun but it is applicable to other downwell objects or tools as well. If the tool is one that can be re-oriented then the method described above may be used. It could, for instance, be useful for various measurement or inspection tools which are periodically introduced into the well. It may be beneficial, for direct comparison between measurements acquired at different times to orient the tool in the same way for the measurements. Given the tool may be removed and re-inserted between measurements this may not previously have been possible without providing a costly magnetic anomaly detector. Using the present invention a low cost directional microphone arrangement may be used with an existing sensing fibre optic cable. It should be noted that with a plurality of different calibrated directional acoustic sources pointing in different directions it would also be possible to determine the relative orientation of a downwell object even without reorienting it by looking at the intensity as the various acoustic sources are activated in turn.

According to another aspect of the invention there is provided a distributed acoustic sensing apparatus for determining the location of an object downwell comprising an interrogator unit configured to, in use, interrogator an optical fibre deployed downwell to provide distributed acoustic sensing and a processor configured to take a plurality of measurement signals acquired when an object having at least one directional acoustic source is located downwell wherein said signals correspond to a plurality of orientations of said object and process the measurement signals to determine the orientation of said object relative to the optical fibre.

The present invention also relates to a well perforator having at least one directional acoustic source located in a fixed orientation relative to a perforation detector.

It should be noted that the techniques described above for enhancing the magnetic signature of the fibre optic cable also represent aspects of the invention. Thus the invention also relates to the use of an optical fibre comprising a magnetic material running along its length as a sensing fibre optic cable for downwell distributed fibre optic sensing. The invention also relates to a method of increasing the magnetic signature of a downwell fibre optic cable by running a current through a conductive path running both ways along the fibre optic cable and also to use of a fibre optic cable having a conductive path running in both directions along the cable as a sensing fibre optic cable for downwell distributed fibre optic sensing.

In yet another embodiment instead of, or in addition to, a distributed acoustic sensor and a directional acoustic source, a distributed fibre optic magnetic sensor could be deployed along the length of the well bore and an object could be provided with a directional RF source. Co-pending patent application GB1014506.8 describes that by coating an optical fibre with magnetostrictive material, any variations in magnetic field can lead to strains in an optical fibre which can be detected in a manner analogous to distributed acoustic sensing. Such an optical fibre could therefore be deployed downwell and would respond to any variations in magnetic field. Thus a directional RF source, which would lead to a varying magnetic field, could be used in similar way to the directional acoustic source as described above. Again however it will be appreciated that generating RF fields downwell may not be acceptable in some situations and thus the acoustic approach is more generally applicable.

DESCRIPTION OF THE DRAWINGS

The invention will now be described by way of example only with respect to the following drawings, of which:

FIGS. 3a and 3b represent perspective a sectional views of a perforator gun;

FIG. 4 illustrates a perforator gun according to an embodiment of the present invention in section in a well bore.

DESCRIPTION OF THE INVENTION

Figure 1:
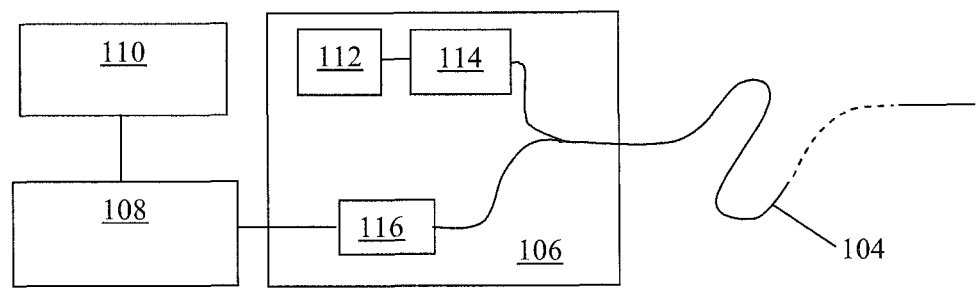
FIG. 1 illustrates the basic components of a fibre optic distributed acoustic sensor.

FIG. 1 shows a schematic of a distributed fibre optic sensing arrangement. A length of sensing fibre 104 is removably connected at one end to an interrogator 106. The output from interrogator 106 is passed to a signal processor 108, which may be co-located with the interrogator or may be remote therefrom, and optionally a user interface/graphical display 110, which in practice may be realised by an appropriately specified PC. The user interface may be co-located with the signal processor or may be remote therefrom.

The sensing fibre 104 can be many kilometers in length and can be at least as long as the depth of a wellbore which may be at least 1.5 km long. The sensing fibre may be a standard, unmodified single mode optic fibre such as is routinely used in telecommunications applications without the need for deliberately introduced reflection sites such a fibre Bragg grating or the like. The ability to use an unmodified length of standard optical fibre to provide sensing means that low cost readily available fibre may be used. However in some embodiments the fibre may comprise a fibre which has been fabricated to be especially sensitive to incident vibrations. In use the fibre 104 is deployed to lie along the length of a wellbore, such as in a production or injection well as will be described.

In operation the interrogator 106 launches interrogating electromagnetic radiation, which may for example comprise a series of optical pulses having a selected frequency pattern, into the sensing fibre. The optical pulses may have a frequency pattern as described in GB patent publication GB2,442,745 the contents of which are hereby incorporated by reference thereto. Note that as used herein the term "optical" is not restricted to the visible spectrum and optical radiation includes infrared radiation and ultraviolet radiation. As described in GB2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 112 and at least one optical modulator 114 for producing a plurality of optical pulse separated by a known optical frequency difference. The interrogator also comprises at least one photodetector 116 arranged to detect radiation which is Rayleigh backscattered from the intrinsic scattering sites within the fibre 104. Note that Rayleigh backscatter based DAS sensor are particularly useful but distributed acoustic sensing based on other scattering modes, such as Brillouin or Raman scattering are also known and could be used.

The signal from the photodetector is processed by signal processor 108. The signal processor conveniently demodulates the returned signal based on the frequency difference between the optical pulses, for example as described in GB2,442,745. The signal processor may also apply a phase unwrap algorithm as described in GB2,442,745. The phase of the backscattered light from various sections of the optical fibre can therefore be monitored. Any changes in the effective path length from a given section of fibre, such as would be due to incident pressure waves causing strain on the fibre, can therefore be detected.

Figure 2:
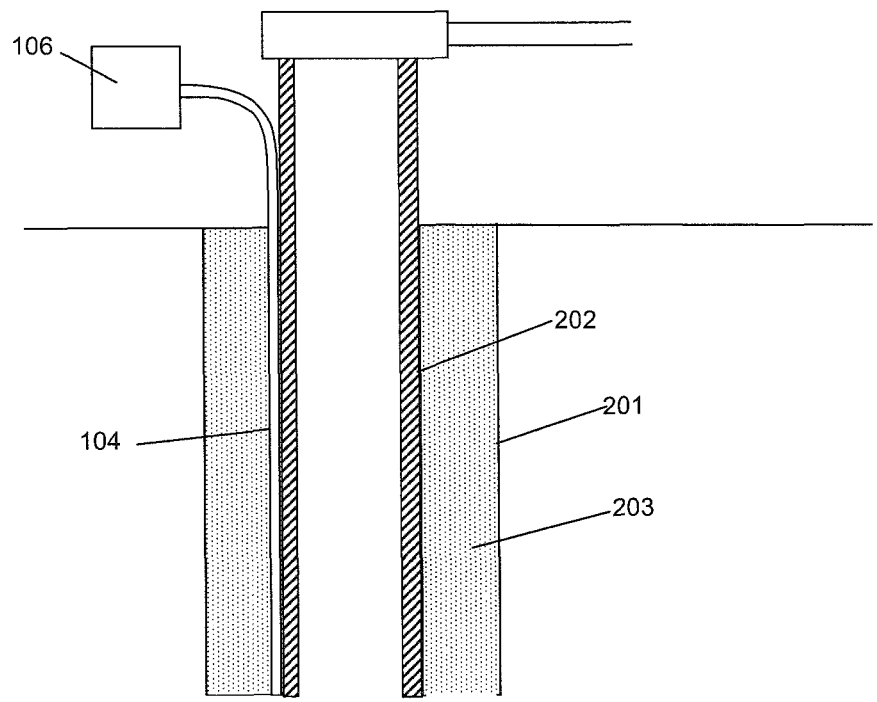
FIG. 2 illustrates deployment of a fibre optic distributed acoustic sensor in a wellbore.

As the sensing optical fibre is relatively inexpensive the sensing fibre may be deployed in a wellbore location in a permanent fashion as the costs of leaving the fibre in situ are not significant. The fibre is therefore conveniently deployed in a manner which does not interfere with the normal operation of the well. A suitable fibre is therefore often installed during the stage of well constructions, such as shown in FIG. 2.

Typically producing or injection wells are formed by drilling a bore hole 201 and then forcing sections of metallic casing 202 down the bore hole. The various sections of the casing are joined together as they are inserted to provide a continuous outer casing.

After the production casing has been inserted to the depth required the void between the borehole and the casing is backfilled with cement 203, at least to a certain depth, to prevent any flow other than through the well itself. As shown in FIG. 2 the optical fibre to be used as the sensing fibre 104 may be clamped to the exterior of the outer casing 202 as it is being inserted into the borehole. In this way the fibre 104 may be deployed in a linear path along the entire length of the wellbore and subsequently cemented in place for at least part of the wellbore. The fibre protrudes from the well head where it may be connected to interrogator 106, which may operate as described above.

Once the casing has been cemented in place, with the optical fibre in situ, a subsequent step in well production is to perforate the well. Perforation involve firing a series of perforation charges, i.e. shaped charges, from within the casing that create perforations through the casing and cement that extend into the rock formation.

Typically an object known as a perforation gun is lowered into the wellbore to perform perforation. The perforation gun will typically comprise a string of charges at different heights and often will have charges aimed in different radial directions. FIG. 3a illustrates a perspective view of some features of a perforation gun 302 and FIG. 3b shows a section view. The gun 302 comprises a generally extended body which is suspended in use via a wire line 304 which may also provide communication with the surface and, in some arrangements, power for firing the charges. A gun supports a series of shaped charges 306 which are arranged to fire in different directions, as illustrated by the arrows. In the example shown in FIG. 3 there are three rows of charges, with each row having three charges arranged to fire in different directions arranged generally evenly around the gun, i.e. at approximately 120° interval. The example shown in FIG. 3 is simplified and the skilled person will appreciate there may be more rows of charges arranged in more complicated arrangement In use the gun is lowered into the well and in some embodiments, for example if charges are located along one side only, some control may be made to ensure that the side bearing the charges is pointing in generally a desired direction. For wells with non vertical peroration sections this may be based on tilt sensor or the like.

When the charges are fired they will perforate the casing, the cement and the surrounding rock to provide flow paths for the oil and gas (or the injected material in injection wells). If one of the shaped charges happens to be pointing toward the optical fibre 104 the shaped charge can sever the fibre at this point, or otherwise cause significant damage to the fibre at this point. This would prevent the fibre below the point of damage from being useable and effectively blind the DAS sensor below this point. As the fibre is cemented in place it can not be easily replaced. Thus it is desired to avoid hitting the fibre when firing the perforation charges.

Conventionally therefore the optical fibre 104 is located next to a metal rod on the outside of the casing 202 and the perforation gun is provided with a directional magnetic anomaly detector (not shown). The gun is thus lowered to the desired point and rotated in position as readings are gathered from the magnetic anomaly detector. Due to the presence of the metallic rod the magnetic anomaly should be greatest when facing the optical fibre.

In practice however the presence of the casing, packers etc. and possibly the surrounding rock material can lead to the magnetic signal being lost. Thus it is not possible to correctly orientate the perforation gun away from the optical fibre and it has been found that the fibre may be cut during perforation.

An embodiment of the present invention is shown in FIG. 4. Here the perforation gun 302 is provided with at least one directional acoustic source, in this example three directional acoustic sources 402a-c. The directional acoustic sources may be formed within the perforation gun 302, or mounted on the perforation gun, or alternatively mounted to the wire line 304 but in fixed relation to the orientation of the perforator gun.

Each acoustic source (and within this specification the term acoustic includes ultrasound and infrasound) is directional in that it produces an acoustic signal with a greater intensity in a preferred direction. The acoustic sources could, for instance, comprise conventional loudspeakers arranged to projects sound forward and located in a casing that absorbs sound emitted in other directions.

Embodiments of the present invention realise that as the optical is in situ for the perforation step the DAS sensor may be used to orientate the perforation gun. Thus the peroration gun is lowered into position with the DAS interrogator connected to the fibre 104 to provide DAS sensing.

When the perforator is in position at least one of the acoustic sources is activated. The acoustic sources may be battery powered, or share power with the perforation gun, and may be controlled from the surface via a fibre optic data line run down the wire line 304.

The perforation gun is then re-oriented, as with the conventional magnetic anomaly technique, but in this embodiment the DAS sensor interrogates the optical fibre to monitor the acoustic signals picked up from the acoustic source(s).

Figure 5:
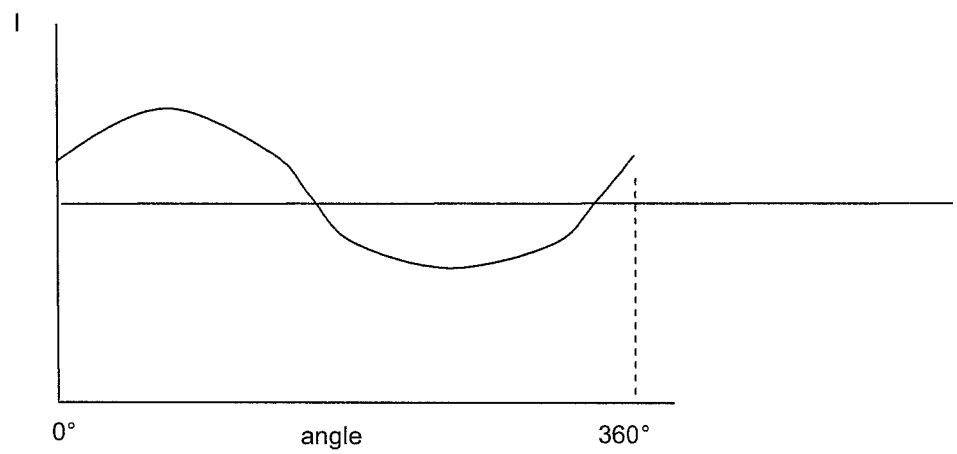
FIG. 5 illustrates the intensity response for the signals from one acoustic source as the perforator is rotated in the well bore.

FIG. 4 shows the perforation gun in the casing 202 in relation to the fibre 104. FIG. 5 illustrates the acoustic intensity that may be detected from acoustic source 402a as the gun 302 is rotated through 360°. Initially a certain intensity is detected which increases as the gun is turned until the directional source is pointing at the location of the fibre. As the gun rotates further the intensity drops away again until it reaches a minimum when pointing away from the fibre after which the intensity increases again (note this is a relatively simple analysis for ease of explanation and neglects complex reflection effects within the casing but the principle is correct).

The acoustic source 402a may be operated continually as the gun is rotated or the gun may be positioned, the source activated for a while and then stopped when the gun is repositioned. The source may produce a continuous sound or a series of pulses of sound. The source may produce a constant frequency or the frequency may vary with time.

In the embodiment shown in FIG. 4 there are three acoustic sources 402a-c. These sources may be provided for redundancy in case of failure but in one embodiment the three sources all operate at different frequencies or at different times. When operating at different frequencies the sources may all operate at the same time and the signals from each can be distinguish by frequency processing of the detected signal. Each frequency would be expected to produce a response similar to that shown in FIG. 5 but with a suitable phase difference.

By using three different sources the need to complete a full revolution of gun is also avoided as by looking at the shape of the intensity curve for each source it can be determine which source swept past the location of the fibre.

Once the location of the fibre is known the perforator can be oriented appropriately to avoid the fibre. In the example shown in FIG. 4 the acoustic sources are located to transmit along directions between the perforation directions and so lining up the perforator gun so that any source was pointing at the fibre location would represent a sage firing position.

If the sources 402a-c are calibrated sources so that each transmits the same acoustic intensity signal it may be possible to determine the orientation of the perforator to a certain accuracy by activating the acoustic sources in turn and looking at the detected response. For instance if there was a strong signal detected (i.e. a relatively high intensity signal) when source 402a was active and less strong signals when sources 402b and 402c were active then it may be determined that source 402a is pointing more in the direction of the fibre than the other sources. The ratio of the intensity of the signals detected from each source may provide further information. For instance in a simple analysis if the signals detected from sources 402b and 402c are about equal intensity this may mean that both are pointing away from the fibre by about the same amount. If however the signal detected from source 402b is higher than that detected from 402c, this could be indicative that the fibre is between sources 402a and 402b (but closer to source 402a). In this way, using multiple sources arranged in different directions it may be possible to determine an idea of the relative orientation of the object to the fibre without needing to re-orientate the object. The resolution achievable in this way may be improved by increasing the number of sources pointing in different directions.

In would also be possible to have the directionality of at least one acoustic source move between at least a first and second known directions relative to the object. In other words in addition to or instead of re-orienting the object relative to the fibre, the directionality of at least one source may be moved relative to the object. In other words the directionality of a source could be swept from a first known orientation relative to the object to a second known orientation relative to the object (and possibly back to the first known orientation). This has the effect of re-orienting the source relative to the sensing fibre and thus provides the same information as if the object with a fixed direction source were re-oriented.

The invention claimed is:

1. A method of orienting an object in a wellbore comprising: varying the orientation of the object in the wellbore; activating at least one directional acoustic source arranged in fixed relation to said object so as to generate sound in a plurality of different orientations of said object; interrogating an optical fibre deployed down the wellbore to provide distributed acoustic sensing in the vicinity of the object; and analyzing acoustic signals detected by the optical fibre so as to determine the orientation of the at least one directional acoustic source relative to the optical fibre wherein the acoustic signals are analyzed to determine the relative intensity of the detected acoustic signals and wherein the detected acoustic signals are analyzed to determine the orientation of the object which leads to the greatest detected acoustic intensity.

2. The method as claimed in claim 1 wherein the at least one directional acoustic source comprises at least one of (i) a loudspeaker in a suitable housing to provide directionality (ii) an acoustic source fixed to or forming part of the object or (iii) an acoustic source configured to transmit an acoustic signal in a direction relative to an orientation of the object.

3. The method as claimed in claim 1 wherein the at least one directional acoustic source transmits at a predefined frequency.

4. The method as claimed in claim 3 comprising analyzing the detected signals for said predefined frequency.

5. The method as claimed in claim 1 wherein a frequency transmitted by at least one directional acoustic source is varied over time.

6. The method as claimed in claim 5 wherein (i) the frequency is varied during a period of continuous transmission or (ii) said acoustic source transmits a first frequency for a first period and then at least a second frequency for at least a second period.

7. The method as claimed in claim 1 wherein (i) the at least one directional acoustic source is configured to transmit constantly as the object is re-oriented or (ii) the object is oriented to a first position and one or more acoustic sources activated and then stopped prior to changing the orientation of the object.

8. The method as claimed in claim 1 wherein the object is provided with more than one directional acoustic source with at least two acoustic sources being arranged to transmit in different directions.

9. The method as claimed in claim 8 wherein (i) each acoustic source is activated in a sequence and the acoustic signals corresponding to each source analyzed together or (ii) at least two of the plurality of directional acoustic sources transmit at different frequencies to one another.

10. The method as claimed in claim 1 wherein (i) the at least one directional acoustic source is pre-programmed to activate at certain times or (ii) the at least one directional acoustic source is controlled from the surface via a data link.

11. The method as claimed in claim 1 wherein the optical fibre is attached to an outside of a well casing.

12. The method as claimed in claim 1 wherein the method further comprises using magnetic anomaly techniques.

13. The method as claimed in claim 1 wherein the object is a well perforator.

14. The method as claimed in claim 1 which is a method of perforating a well that comprises determining the orientation of a perforator relative to the optical fibre, orienting the perforator to avoid the optical fibre and firing the perforator.

15. The method of claim 1 wherein to determine the orientation of objects, having directional acoustic sources, in a wellbore.

16. A distributed acoustic sensing apparatus for determining the location of an object downwell comprising an interrogator unit configured to, in use, interrogate an optical fibre deployed downwell to provide distributed acoustic sensing and a processor configured to take a plurality of measurement signals acquired when the object having at least one directional acoustic source is located downwell wherein said signals correspond to a plurality of orientations of said object and process the measurement signals to determine the orientation of said object relative to the optical fibre, wherein the directional acoustic source generates acoustic waves that have a greater intensity in one direction than in other directions, and wherein the acoustic signals are analyzed to determine the relative intensity of the detected acoustic signals and wherein the detected acoustic signals are analyzed to determine the orientation of the object which leads to the greatest detected acoustic intensity.

\* \* \* \* \*